US009491212B2

(12) United States Patent
Jiang et al.

(10) Patent No.: US 9,491,212 B2
(45) Date of Patent: Nov. 8, 2016

(54) METHOD FOR STREAMING MEDIA AND MEDIA CONTROLLER

(71) Applicant: Huawei Technologies Co., Ltd., Shenzhen, Guangdong (CN)

(72) Inventors: Long Jiang, Shenzhen (CN); Xiaodong Zheng, Hangzhou (CN); Hengzong Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 482 days.

(21) Appl. No.: 13/896,114

(22) Filed: May 16, 2013

(65) Prior Publication Data

US 2013/0254268 A1 Sep. 26, 2013

Related U.S. Application Data

(63) Continuation of application No. PCT/CN2011/083540, filed on Dec. 6, 2011.

(30) Foreign Application Priority Data

Mar. 23, 2011 (CN) .......................... 2011 1 0077211

(51) Int. Cl.
*H04L 29/06* (2006.01)
*H04L 29/12* (2006.01)
*H04N 21/2183* (2011.01)

(52) U.S. Cl.
CPC ............... *H04L 65/60* (2013.01); *H04L 61/00* (2013.01); *H04L 65/4084* (2013.01); *H04L 65/605* (2013.01); *H04N 21/2183* (2013.01); *H04L 61/2038* (2013.01)

(58) Field of Classification Search
CPC ... H04L 65/60; H04L 61/00; H04L 65/4084; H04L 65/605; H04L 61/2038; H04N 21/2183
See application file for complete search history.

(56) References Cited

U.S. PATENT DOCUMENTS 6,438,630 B1 * 8/2002 DeMoney ....................... 710/56
6,708,213 B1 * 3/2004 Bommaiah et al. .......... 709/226

(Continued)

FOREIGN PATENT DOCUMENTS

CN 1909509 A 2/2007
CN 101083756 A 12/2007

(Continued)

OTHER PUBLICATIONS

International Search Report in corresponding PCT Patent Application No. PCT/CN2011/083540 (Mar. 15, 2012).

(Continued)

*Primary Examiner* — Wing F Chan
*Assistant Examiner* — Billy H Ng
(74) *Attorney, Agent, or Firm* — Leydig, Voit & Mayer, Ltd.

(57) ABSTRACT

Embodiments provide a method for streaming media and a media controller. The method includes: receiving, by a media controller, a media streaming request sent by a user equipment, and allocating an index to the user equipment, wherein the index is used to indicate an address of a corresponding buffer in the media controller to which data to be streamed is stored; binding the streaming request and the index of the user equipment and storing in a table, and sending the them to a media server so that the media server controls, according to the table, a storage device to send the data to be streamed to an address of a buffer corresponding to the index; and receiving then streaming the data to be streamed that is requested by the streaming request to the corresponding user equipment by querying the table.

14 Claims, 4 Drawing Sheets

21

The media controller receives a media streaming request sent by a user equipment, and allocates an index to the user equipment, where the index is used to indicate an address of an corresponding buffer in the media controller to which data to be streamed that is requested by the streaming request is stored

22

The media controller binds the streaming request and the index of the user equipment, stores the bound streaming request and index in a correspondence table, and sends the streaming request and the index of the user equipment to a media server so that the media server controls, according to the correspondence table, a storage device to send the data to be streamed that is requested by the streaming request to an address of a buffer corresponding to the index

23

The media controller receives the data to be streamed that is requested by the streaming request and is sent by the storage device, and streams the data to be streamed that is requested by the streaming request to the corresponding user equipment by querying the correspondence table

(56) References Cited

U.S. PATENT DOCUMENTS

| | | | | |
|---|---|---|---|---|
| 7,359,955 | B2 * | 4/2008 | Menon et al. | 709/219 |
| 7,924,456 | B1 | 4/2011 | Kahn et al. | |
| 2006/0218605 | A1 | 9/2006 | Hirao et al. | |
| 2008/0133868 | A1 * | 6/2008 | Glew | G06F 9/3012 711/171 |
| 2009/0083476 | A1 | 3/2009 | Pua et al. | |
| 2010/0146068 | A1 | 6/2010 | Haviv | |
| 2010/0312826 | A1 | 12/2010 | Sarosi et al. | |
| 2011/0126287 | A1 * | 5/2011 | Yoo | G06F 21/56 726/24 |
| 2012/0317187 | A1 * | 12/2012 | Fredricksen | H04L 29/08729 709/203 |
| 2013/0166625 | A1 * | 6/2013 | Swaminathan | H04N 21/64738 709/203 |

FOREIGN PATENT DOCUMENTS

| | | | |
|---|---|---|---|
| CN | 101094243 | A | 12/2007 |
| CN | 101216790 | A | 7/2008 |
| CN | 101340574 | A | 1/2009 |
| CN | 101365170 | A | 2/2009 |
| CN | 101582919 | A | 11/2009 |
| CN | 102130960 | A | 7/2011 |
| JP | 2006304272 | A | 11/2006 |
| JP | 2007067521 | A | 3/2007 |
| JP | 2008234629 | A | 10/2008 |

OTHER PUBLICATIONS

1st Office Action in corresponding Chinese Patent Application No. 201110077211.1 (Sep. 29, 2012).

* cited by examiner

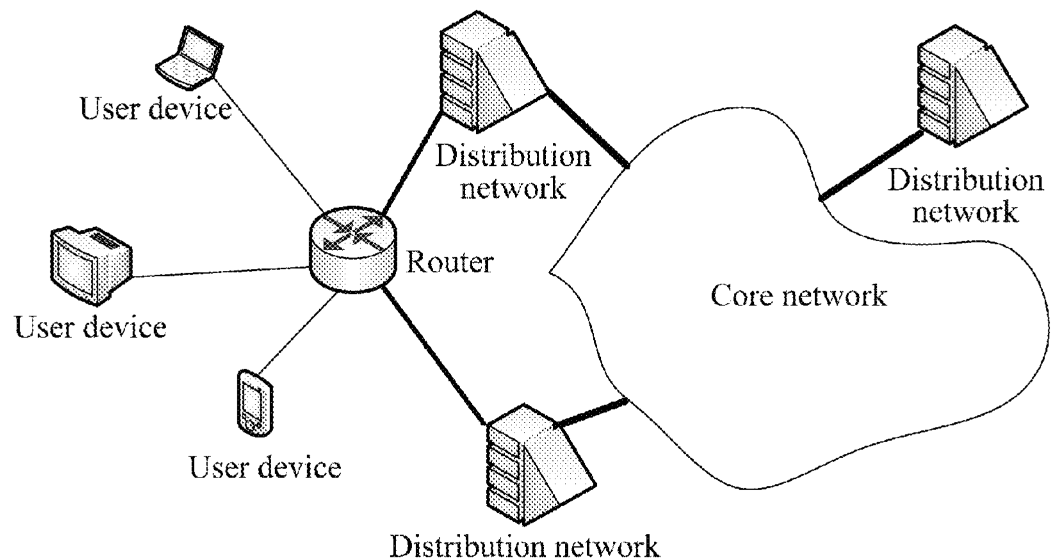
FIG. 1 <Prior Art>

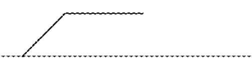

The media controller receives a media streaming request sent by a user equipment, and allocates an index to the user equipment, where the index is used to indicate an address of an corresponding buffer in the media controller to which data to be streamed that is requested by the streaming request is stored

22

The media controller binds the streaming request and the index of the user equipment, stores the bound streaming request and index in a correspondence table, and sends the streaming request and the index of the user equipment to a media server so that the media server controls, according to the correspondence table, a storage device to send the data to be streamed that is requested by the streaming request to an address of a buffer corresponding to the index

23

The media controller receives the data to be streamed that is requested by the streaming request and is sent by the storage device, and streams the data to be streamed that is requested by the streaming request to the corresponding user equipment by querying the correspondence table

FIG. 2

METHOD FOR STREAMING MEDIA AND MEDIA CONTROLLER

CROSS-REFERENCE TO RELATED APPLICATIONS

This application is a continuation of International Patent Application No. PCT/CN2011/083540, filed on Dec. 6, 2011, which claims priority to Chinese Patent Application No. 201110077211.1, filed on Mar. 23, 2011, both of which are hereby incorporated by reference in their entireties.

FIELD OF THE INVENTION

The present invention relates to a communications technology, and in particular to a method for streaming media and a media controller.

BACKGROUND OF THE INVENTION

As shown in FIG. 1, streaming media pushes data frequently to the edge of a core network. The data is being accessed by a user over a distribution network. Then the streaming media sends the streaming media content internally. The streaming media content is stored in the distribution network and required by the user to a user equipment (UE) through routers. The distribution networks include the media delivery network (MDN) and content delivery network (Content Delivery Network). The current media streaming process is as follows: when a user terminal needs to access a certain streaming media, the user terminal sends a request to the CPU of the distribution network; the CPU applies for a segment of buffering space that is used to store the data, the user terminal sends a request for acquiring the data to a storage device using the initial address of the buffering space as the destination address for receiving the data, and returns the acquired data to the user terminal.

In a media streaming scenario, as the quantity of the users increases, and the CPU on the distribution network needs to perform other system tasks, as a result, the performance of the CPU on the distribution network is affected and becomes inefficient.

SUMMARY OF THE INVENTION

Embodiments of the present invention provide a method for streaming media and a media controller, implementing separation of data from the CPU on the distribution network, and improving the running speed of the CPU on the distribution network.

An embodiment of the present invention provides a method for streaming media. The method includes:

receiving, by a media controller, a media streaming request sent by a user equipment, and allocating an index to the user equipment, where the index is used to indicate an address of a corresponding buffer in the media controller to which data to be streamed that is requested by the streaming request is stored;

binding, by the media controller, the streaming request and the index of the user equipment, storing the bound streaming request and index in a correspondence table, and sending the streaming request and the index of the user equipment to a media server so that the media server controls, according to the correspondence table, a storage device to send the data to be streamed that is requested by the streaming request to an address of a buffer corresponding to the index; and receiving, by the media controller, the data to be streamed that is requested by the streaming request and is sent by the storage device, and streaming the data to be streamed that is requested by the streaming request to the corresponding user equipment by querying the correspondence table.

An embodiment of the present invention further provides a media controller, which can be located on a distribution network. The media controller includes:

a request receiving module, configured to receive a media streaming request sent by a user equipment;

an index allocating module, configured to allocate an index to the user equipment, where the index is used to indicate an address of a corresponding buffer in the media controller to which data to be streamed that is requested by the streaming request is stored;

a storage module, configured to bind the streaming request and the index of the user equipment received by the request receiving module, and store the bound streaming request and index in a correspondence table;

a sending module, configured to send the streaming request and the index of the user equipment to a media server so that the media server controls, according to the correspondence table, a storage device to send the data to be streamed that is requested by the streaming request to an address of a buffer corresponding to the index;

a data receiving module, configured to receive the data to be streamed that is requested by the streaming request and is sent by the storage device; and a streaming module, configured to query the correspondence table in the storage module and stream data to be streamed that is requested by the streaming request to the corresponding user equipment.

It can be seen that, through a media controller, the technical scheme provided in the preceding embodiment stores data to be streamed that is requested by a user, and streams the data to the user, implementing separation of data from the CPU on the distribution network, improving the running speed of the CPU on the distribution network, and avoiding the increase of address width due to too many users by allocating indexes to user equipments.

BRIEF DESCRIPTION OF THE DRAWINGS

To make the technical solution of the present invention clearer, the accompanying drawings for illustrating the embodiments of the present invention or the prior art are briefly described below. Apparently, the accompanying drawings are for the exemplary purpose only, and person skilled in the art can derive other drawings from such accompanying drawings without any creative effort.

FIG. 1 is a schematic diagram of streaming media in a prior art;

FIG. 2 is a flowchart of a method for streaming media provided in an embodiment of the present invention;

DETAILED DESCRIPTION

Figure 3:
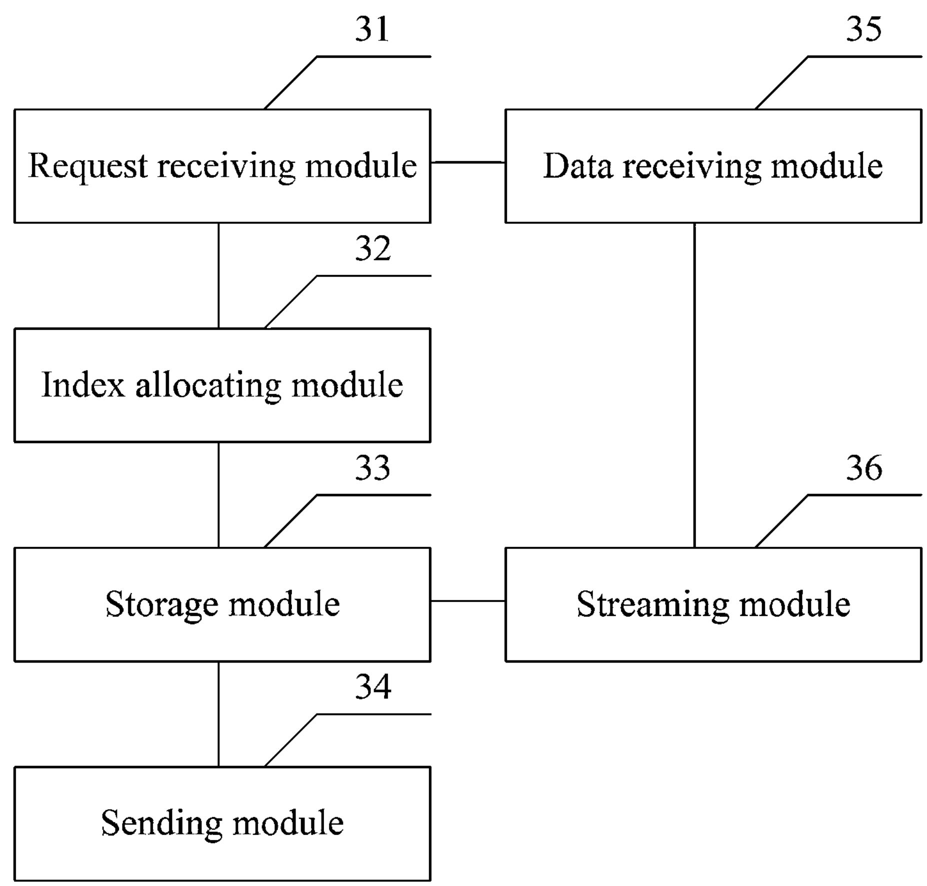
FIG. 3 is a schematic diagram of a media controller apparatus provided in an embodiment of the present invention.

The technical solutions under the present invention are described below with reference to the accompanying drawings. Evidently, the embodiments described below are for the exemplary purpose only, without covering all embodiments of the present invention. Those skilled in the art can derive other embodiments from the embodiments provided herein without making any creative effort, and all such embodiments are covered in the protection scope of the present invention.

An embodiment of the present invention provides a method for streaming media as shown in FIG. 2. The media controller and media server can be located on a distributed network. The media controller may be an FPGA (Field Programmable Gate Array, field programmable gate array). The media server can be a CPU on the distribution network. The storage device can be an SSD (Solid State Disk, solid state disk). The method includes the following steps:

Step 21: The media controller receives a media streaming request sent by a user equipment, and allocates an index to the user equipment, where the index is used to indicate an address of a corresponding buffer in the media controller to which data to be streamed that is requested by the streaming request is stored.

Specifically, the streaming request sent by the user equipment can include identity information about a user, for example, an IP address of the user or user name information; or include information such as a type or a name of the requested data, for example, video data or audio data.

Alternatively, before Step 21 is executed, a step of dividing a buffer in the media controller according to the size of the storage space of the data into blocks with the same size or different sizes may be included, where each block corresponds to one index. For example, if the size of the storage space of the data is 1 Mbyte, a 4 G buffer may be divided into 4096 blocks with the same size, where the size of each block is 1 Mbyte and each block is allocated one index. The index can be any unique integer ranging from 1 to 4096. If the address of 1 Mbyte is 10000-20000, the index indicates a 1 Mbyte space corresponding to the address 10000-20000. When a media streaming request sent by a user equipment is received, the index is allocated at random to the user equipment.

Further, the media controller can maintain an available index table, and the table records indexes that are not allocated to user equipments. For example, among a total of 4096 indexes, 4000 have been allocated to user equipments, the available index table then contains the remaining 96 indexes. After all indexes have been allocated to user equipments, that is, no indexes exist in the available index table, when a media streaming request sent by a user equipment is received, the user equipment is notified to wait; for example, a 4 G buffer is divided into 4096 blocks with 4096 indexes. After all these 4096 indexes have been allocated to user equipments, when a media streaming request sent by a user equipment is received, the user equipment is notified to wait until an index among the 4096 indexes is released, that is, when the released index is recorded in the available index table again, the released index is allocated to the waiting user equipment.

Step 22: The media controller binds the streaming request and the index of the user equipment, stores the bound streaming request and index in a correspondence table, and sends the streaming request and the index of the user equipment to a media server so that the media server controls, according to the correspondence table, a storage device to send the data to be streamed that is requested by the streaming request to an address of a buffer corresponding to the index.

Alternatively, the correspondence table can include but is not limited to the following information. The size of the requested data corresponding to the streaming request of the user equipment can be changed. When the correspondence table needs to store a size of requested data, the size of the requested data is returned after the media server receives the streaming request and the index of the user equipment:

| Index | Buffer Address | User ID | Name of Requested Data | Size of Requested Data |
|---|---|---|---|---|
| 1 | 10000-20000 | ID1 | Video 1 | 50M |
| . . . | . . . | . . . | . . . | . . . |
| 4096 | 110000-120000 | ID4096 | Video 4096 | 80M |

Step 23: The media controller receives the data to be streamed that is requested by the streaming request and is sent by the storage device, and streams the data to be streamed that is requested by the streaming request to the corresponding user equipment by querying the correspondence table.

Specifically, the correspondence table is queried, the requested data is read from the buffer of the media controller and streamed to the user equipment in the correspondence table, the index corresponding to the user equipment is released after data streaming is complete, and the information about the binding of the streaming request and the index of the user equipment is deleted from the correspondence table.

An embodiment of the present invention provides a media controller, as shown in FIG. 3. The media controller is located on the distribution network. The media controller may be an FPGA (Field Programmable Gate Array, field programmable gate array). The media controller includes:

a request receiving module 31, configured to receive a media streaming request sent by a user equipment.

Specifically, the streaming request sent by the user equipment may include identity information about a user, for example, an IP address of the user or user name information; or include information such as a type or a name of the requested data, for example, video data or audio data;

an index allocating module 32, configured to allocate an index to the user equipment, where the index is used to indicate an address of a corresponding buffer in the media controller to which data to be streamed that is requested by the streaming request is stored;

alternatively, before the index allocating module 32 is executed, a determining index module may further be included, which is configured to divide a buffer in the media controller according to the size the storage space of the data into blocks with the same size or different sizes, where each block corresponds to one index. For example, if the size of the storage space of the data is 1 Mbyte, a 4 G buffer can be divided into 4096 blocks with the same size, where the size of each block is 1 Mbyte and each block is allocated one index. The index can be any unique integer ranging from 1 to 4096. If the address of IMbyte is 10000-20000, the index indicates a 1 Mbyte space corresponding to the address 10000-20000. When a media streaming request sent by a user equipment is received, the index is allocated at random to the user equipment;

Further, the media controller can maintain an available index table, which records indexes that are not allocated to user equipments. For example, among a total of 4096 indexes, 4000 have been allocated to user equipments. Then the available index table contains the remaining 96 indexes. Alternatively, a notifying module may further be included, which is configured to instruct the user equipment to wait after all indexes have been allocated to user equipments, that is, no indexes exist in the available index table, when the media controller receives a media streaming request sent by a user equipment; for example, a 4 G buffer is divided into 4096 indexes. After all these 4096 indexes have been allocated to user equipments, when a media streaming request sent by a user equipment is received, the user equipment is notified to wait until an index among the 4096 indexes is released, that is, when the released index is recorded in the available index table again, the released index is allocated to the waiting user equipment;

a storage module 33, configured to bind the streaming request and the index of the user equipment received by the request receiving module 31, and store, in a correspondence table, the streaming request of the user equipment and the index allocated by the index allocating module 32; alternatively, further configured to store length of the data to be streamed that is requested by the streaming request received by a data receiving module 35, and/or broadband information corresponding to the user equipment to the correspondence table;

Alternatively, the correspondence table can include but is not limited to the following information. The size of the requested data corresponding to the streaming request of the user equipment can be changed. When the correspondence table needs to store a size of requested data, the size of the requested data is returned after the media server receives the streaming request and the index of the user equipment:

| Index | Buffer Address | User ID | Name of Requested Data | Size of Requested Data |
|---|---|---|---|---|
| 1 | 10000-20000 | ID1 | Video 1 | 50M |
| . . . | . . . | . . . | . . . | . . . |
| 4096 | 110000-120000 | ID4096 | Video 4096 | 80M |

a sending module 34, configured to send the streaming request and the index of the user equipment to a media server so that the media server controls, according to the correspondence table, a storage device to send the data to be streamed that is requested by the streaming request to an address of a buffer corresponding to the index;

a data receiving module 35, configured to receive the data to be streamed that is requested by the streaming request and is sent by the storage device; alternatively, further configured to receive length of the data to be streamed that is requested by the streaming request and is sent by the media server, and/or broadband information corresponding to the user equipment; and a streaming module 36, configured to query the correspondence table in the storage module and stream the data to be streamed that is requested by the streaming request to the corresponding user equipment.

Specifically, the correspondence table is queried, and the requested data is read from the buffer of the media controller and streamed to the user equipment in the correspondence table. Alternatively, after data streaming is complete, a releasing module may be further included, which is configured to release the index corresponding to the user equipment after the data to be streamed that is requested by the streaming request and is streamed to the user equipment, and delete the information about the binding of the streaming request and the index of the user equipment from the correspondence table.

Figure 4:
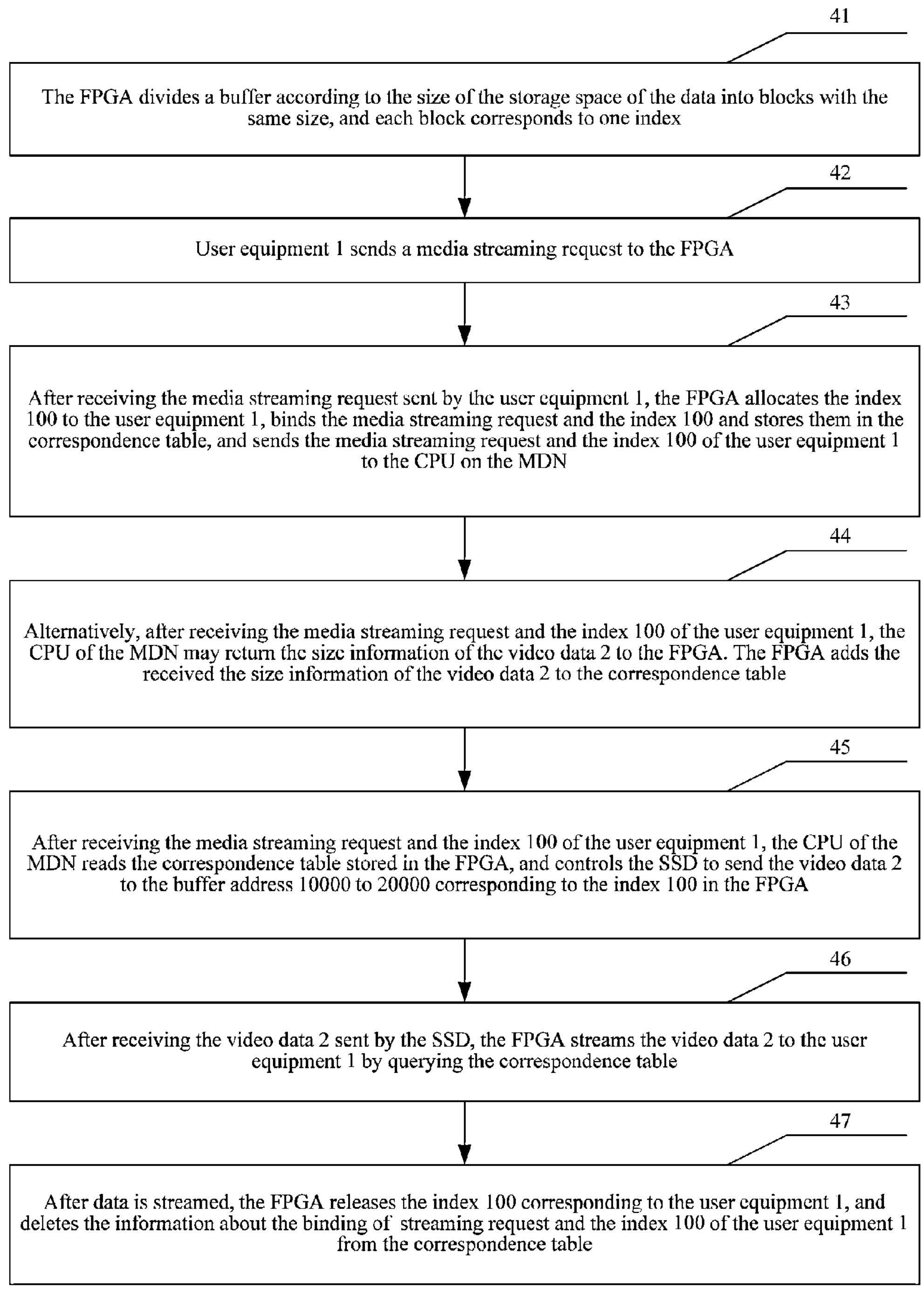
FIG. 4 is a flowchart of another method for streaming media provided in an embodiment of the present invention.

An embodiment of the present invention provides another method for streaming media, and describes the method by assuming that the media controller is an FPGA, the media server is a CPU on an MDN, the storage device is an SSD, and user equipment 1 requests streaming video data 2. As shown in FIG. 4, the method includes the following steps:

Step 41: The FPGA divides a buffer according to the size of the storage space of the data into blocks with the same size. Each block corresponds to an index. For example, if the size of the storage space of the data is 1 Mbyte, a 4 G buffer can be divided into 4096 blocks with the same size, where the size of each block is 1 Mbyte and each block is allocated one index. The index can be any unique integer ranging from 1 to 4096. The index is used to indicate a buffer address corresponding to each block.

Step 42: User device 1 sends a media streaming request to the FPGA. The media streaming request may include relevant information such as the identity information of user equipment 1 and information indicating that the name of the data to be streamed in the request is video data 2. The data to be streamed in the request may be video, audio, or other forms of data.

Step 43: The FPGA allocates the index 100 (the buffer address indicated by the index may be 10000-20000) to the user equipment 1 after receiving the media streaming request sent by the user equipment 1, binds the media streaming request and the index 100 and stores them in the correspondence table, and sends the media streaming request and the index 100 of the user equipment 1 to the CPU of the MDN. The correspondence table may include but is not limited to the following table:

| Index | Buffer Address | User ID | Name of Requested Data |
|---|---|---|---|
| 100 | 10000-20000 | User device 1 | Video data 2 |

Alternatively, after all the 4096 buffers in the FPGA are allocated to user equipments, if the FPGA receives the media streaming request of the user equipment 1, the FPGA notifies the user equipment 1 to wait.

Step 44: Alternatively, after receiving the media streaming request and the index 100 of the user equipment 1, the CPU of the MDN may return the size information (for example 800 M) of the video data 2 to the FPGA. The FPGA adds the received the size information of the video data 2 to the correspondence table. The correspondence table to which the size information is added is as follows:

| Index | Buffer Address | User ID | Name of Requested Data | Size of Requested Data |
|---|---|---|---|---|
| 100 | 10000-20000 | User device 1 | Video data 2 | 800M |

Step 45: After receiving the media streaming request and the index 100 of the user equipment 1, the CPU of the MDN reads the correspondence table stored in the FPGA, and controls the SSD to send the video data 2 to the buffer address 10000-20000 corresponding to the index 100 in the FPGA.

Step 46: After receiving the video data 2 sent by the SSD, the FPGA streams the video data 2 to the user equipment 1 by querying the correspondence table.

Step 47: After the data is streamed, the FPGA releases the index 100 corresponding to the user equipment 1, and deletes the information about the binding of the streaming request and the index of the user equipment 1 from the correspondence table.

An embodiment provides a method for streaming media. By making a media controller store the data to be streamed that is requested by a streaming request, and stream the data to the corresponding user, the method implements separation of data from the CPU on the distribution network, and improves the service processing capability of the CPU on the distribution network. In addition, by allocating indexes, the method avoids increase of the address width due to too many users, and enables efficient management of the internal buffer space of the media controller while keeping the streaming bandwidth unchanged, thereby reducing the dependency of the hardware scheme on the address width.

It should be noted that, in the preceding embodiment for the media controller, all the included modules are divided only according to the function logic, but are not confined to the division method as long as the corresponding functions can be implemented. In addition, the names of all the function modules are only intended to distinguish between each other, but are not configured to restrict the protection scope.

In addition, those skilled in the art can understand that all or part of the steps in the preceding method can be completed by using a program to instruct the hardware. The program can be stored in a storage medium, such as read only memory, magnetic disk, and compact disk, which can be read by a computer.

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for streaming media, comprising:

receiving, by a media controller, a media streaming request sent by a user equipment requesting data, and allocating an index to the user equipment, wherein the index is used to indicate an address of a buffer corresponding to the user equipment in the media controller;

binding, by the media controller, the streaming request and the index of the user equipment and storing the bound streaming request and the index of the user equipment in a correspondence table in the media controller;

sending the streaming request and the index of the user equipment to a media server in a distribution network, so that the media server controls a storage device to send the data to the address of the buffer in the media controller corresponding to the index, according to the correspondence table instead of sending the data directly from the storage device to the user equipment; and receiving, by the media controller, the data sent by the storage device, storing the data in the buffer and streaming the data to the user equipment according to the correspondence table.

2. The method according to claim 1, wherein before the receiving, by the media controller, the media streaming request sent by the user equipment, the method further comprising:

dividing, by the media controller, the buffer according to a size of a storage space of the data into blocks with a same size, wherein each block corresponds to one index.

3. The method according to claim 1, wherein after the streaming the data to the user equipment, the method further comprises:

releasing the index corresponding to the user equipment, and deleting information about the binding of the streaming request and the index of the user equipment from the correspondence table.

4. The method according to claim 1, wherein after allocating all indexes to user equipments, the method further comprises:

receiving, by the media controller, a new media streaming request sent by a new user equipment, and notifying the new user equipment to wait.

5. The method according to claim 1, wherein after the sending the streaming request and the index of the user equipment to the media server, the method further comprising:

receiving, from the media server, at least one of the groups consisting of (a) length of the data to be streamed, and (b) broadband information corresponding to the user equipment, wherein the data is sent by the media server, and storing at least one of the groups consisting of (a) the length of the data to be streamed and (b) the broadband information corresponding to the user equipment in the correspondence table.

6. A media controller located on a distribution network, the media controller comprising:

a processor; and a storage medium storing executable instructions that when executed configures the processor to:

receive a media streaming request sent by a user equipment that is requesting data to be streamed from a media server;

allocate an index to the user equipment, wherein the index indicates an address of a buffer for storing the requested data to be streamed;

associate the media streaming request and the index, and store the associated media streaming request and index in a table;

send the media streaming request and the index to the media server in the distribution network so that the media server controls a storage device in the distribution network to send the requested streaming data to the address of the buffer indicated by the index stored in the table, and not directly from the storage device to the user equipment;

receive the requested streaming data sent by the storage device; and query the table in a storage memory and stream the data to the user equipment.

7. The media controller according to claim 6, wherein the processor is further configured to:

divide the buffer according to a size of a storage space of the requested data into blocks with a same size, wherein each block corresponds to one index.

8. The media controller according to claim 6, wherein the processor is further configured to:

release the index corresponding to the user equipment, after the requested data is streamed to the user equipment, and delete information about the binding of the streaming request and the index of the user equipment from the table.

9. The media controller according to claim 6, wherein the processor is further configured to:

after all indexes have been allocated to user equipment, when the media controller receives a new media streaming request sent by a new user equipment, instruct the new user equipment to wait.

10. The media controller according to claim 6, wherein the processor is further configured to:

receive at least one of the groups consisting of (a) length of the data to be streamed, and (b) broadband information corresponding to the user equipment, wherein the data is sent by the media server; and store at least one of the groups consisting of (a) the length of the data to be streamed, and (b) the broadband information corresponding to the user equipment to the table, wherein the data to be streamed is requested by the streaming request.

11. The method for streaming media according to claim 1, wherein the index to the user equipment is randomly allocated.

12. The media controller according to claim 6, wherein the processor is further configured to randomly allocate the index to the user equipment.

13. A media controller located on a distribution network, the media controller comprising:

a processor; and a storage medium storing executable instructions that when executed configure the processor to:

(a) allocate an index indicating an address of a buffer for storing a data requested by a user equipment making a media streaming request;

(b) send the media streaming request and the index to a media server in the distribution network so that the media server controls a storage device in the distribution network to send the requested streaming data to the address of the buffer indicated by the index stored in a table, and not directly from the storage device to the user equipment;

(c) receive the data from the media server into the buffer indicated by the index;

(d) stream the data from the buffer to the user equipment; and (e) release the index to be reused.

14. The media controller according to claim 13 wherein the processor is further configured delete information in a table associating the media streaming request and the index.

* * * * *